July 23, 1929.  J. PREDHUMEAU  1,721,833
SIGNAL
Filed Oct. 23, 1925
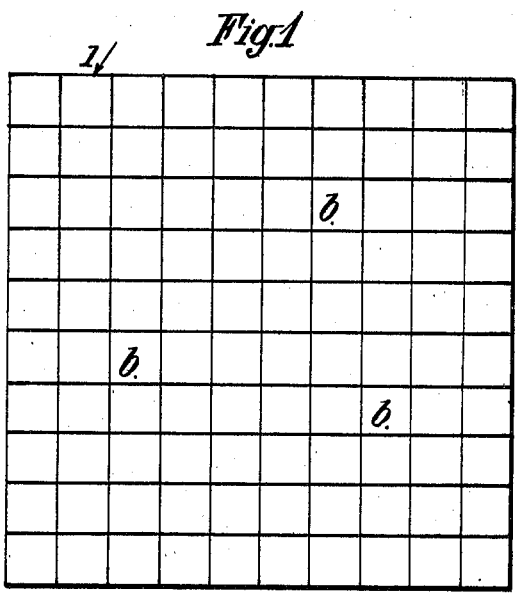
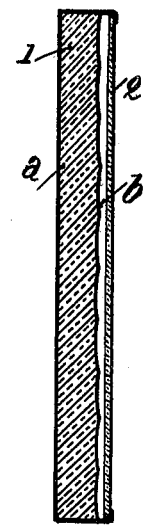
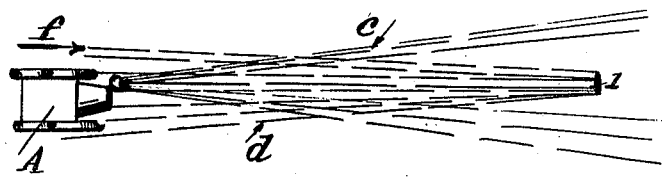
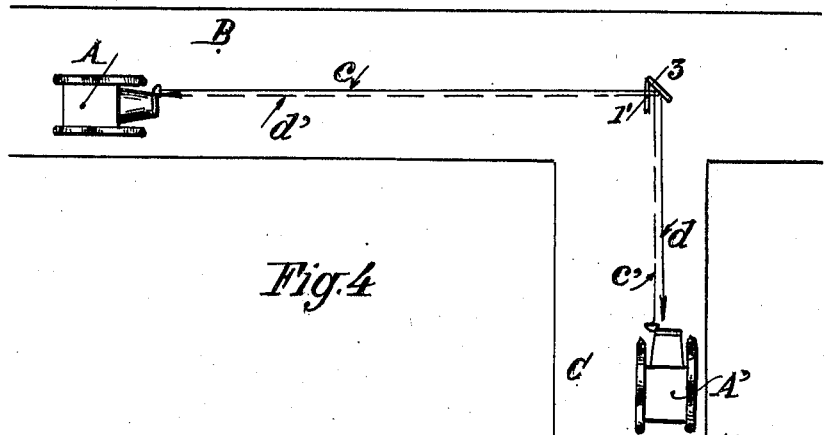
INVENTOR
Joseph Predhumeau
BY Townsend & Decker
ATTORNEYS.

Patented July 23, 1929.

1,721,833

UNITED STATES PATENT OFFICE.

JOSEPH PREDHUMEAU, OF LE PUY, FRANCE.

SIGNAL.

Application filed October 23, 1925, Serial No. 64,391, and in France January 19, 1925.

Night signals used at the present time to assure traffic safety on roads, railways, canals, etc. or for any other similar purpose comprises a luminous source which is part of the signalling apparatus the accidental extinction of which might cause serious accidents.

The object of the present invention is to overcome these inconveniences by illuminating the signal by means of a fixed or moving independent luminous focus which can be placed at a considerable distance from the signal and which projects on to the signal a luminous beam such that the signal appears to an observer placed in a determined path to be illuminated by direct light.

The signal, according to the present invention, comprises a series of small concave or convex mirrors, whose axes are parallel, juxtaposed in such a way that on receiving an incident luminous beam from a fixed or moving focus, even at a distance, it appears to an observer placed in the field of the reflected rays that the signal is directly illuminated.

The luminous focus may be carried for example by the vehicles themselves the head light of an automobile or locomotive, etc.

The mirrors are preferably placed side by side in such a way that the luminous points formed by these mirrors may be illuminated to an angular distance smaller than or at the most equal to one sexagesimal minute of angle.

It is known that when a cylindrical luminous beam falls on a concave or convex mirror, the field containing the reflected rays is a cone whose value is equal to the proportion of the effective breadth of the mirror to the focal length. Any observer placed inside this cone will thus see a highly luminous point in the focal plane of the mirror, the image of the distant source of light which produced the beam, It is known, moreover, that all adjoining luminous points placed at an angular distance less than or equal to one sexagesimal minute appear to the eye of an observer as a uniformly illuminated surface.

The signal formed by the juxtaposition of all these small mirrors with a parallel axis and illuminated by an incident luminous beam coming from any appropriate source, will be seen by an observer as a reflected beam and will appear to him as a uniformly illuminated surface.

This surface can be of any desired shape (square, circular, lozenge, etc.) according to the shape given by the signal formed of all the small mirrors.

A coloured light of any appropriate colour can be seen according to the colour which is directed to the mirrors or by a green or any analogous coloured screen placed in front of the signal.

The mirrors can be either metallic and formed of spherical surfaces shaped or cast in an appropriate metal, or glass obtained by shaping or moulding a mirror having either a plain or silvered surface. All the mirrors forming the signal may be made in the small plate of any appropriate shape or they may be made separately and then assembled in the same base plate.

The invention is illustrated by way of example in the accompanying drawings in which Fig. 1 is a front elevation of the signal of multiple mirrors without coloured glass in front; Fig. 2 is a transverse sectional view showing coloured glass in front of the mirrors; Fig. 3 shows the application of this signal device as a night safety signal device illuminated by automobiles on a road and Fig. 4 is the application of the invention to signal systems at cross roads.

The signal is formed by a glass plate 1 comprising a plane silvered surface $a$ and a surface moulded or shaped so as to form a quantity (100 for example) of small spherical surfaces $b$ (either hollow or embossed) for example on a side of .01 metres and radius .25 metres, the spherical surfaces thus formed being relatively flat or shallow.

Calculation will show that, in the example, the light falling on the eye of an observer is by unity of surface of the luminous plate 4000 times as strong as if the same surface were painted white.

When the signal thus formed is placed in the path of one or more lamps of an automobile A (Fig. 3) travelling in the direction of the arrow $f$ it will give the driver of the automobile the impression of a uniform light illuminating surface and this even if the automobile is to the right or left of the centre of the road if the signal is made to give a sufficiently large field $d$ of reflected rays.

In calculating the width of the mirrors $b$ the path of the reflected rays and consequently the intensity of reception can be varied.

In particular in the case of signals for railways the path of the rays will be considerably reduced so as to obtain a sufficient intensity of reflection with the normal lighting of locomotives.

It is possible to cover the signal with a coloured glass 2 (Fig. 2) of parallel surfaces so as to reflect a coloured luminous beam, but without interfering with the optical properties of the mirrors.

It is also possible to combine at the meeting of two roads B and C (Fig. 4) a signal plate 1' made according to this invention of non-silvered glass on its rear face and normal to the axis of one of the roads, with a silvered or ordinary mirror 3 placed behind and at 45° or any other lesser angle thereto, for signalling to the drivers of each of the automobiles A A¹, approaching the cross roads, at the same time. The incident luminous rays $c$ from the lamp of the automobile A after having crossed the signal plate 1 and being reflected on to the oblique mirror 3 produce reflected rays $d$ which will be seen by the driver of the automobile A¹ and vice versa.

Instead of sending the luminous ray on to the signal by means of a moving focus (lamp of an automobile etc.) a fixed focus can equally well be used placed at an appropriate point; for example a projector placed at an easily accessible point and illuminating signals suitably formed and coloured on a mounting placed at any inaccessible point.

This signal system which has the advantage of necessitating no repairs, can be used equally well for luminous advertising on roads, for example, and for any other apparatus which require actual luminous sources.

Having now particularly described and ascertained the nature of my said invention and in what manner the same is to be performed I declare that what I claim is:—

1. A signal comprising small mirrors having spheroidal surfaces and arranged with their axes substantially parallel and so disposed with respect to one another that the luminous points provided by any two adjoining mirrors are located at an angular distance not exceeding one sexagesimal minute.

2. The combination of a signal comprising a plurality of small integral sections of transparent material, each of which has a relatively shallow spheroidal surface, said sections being arranged in close proximity to one another and with their axes substantially parallel, and a substantially plane reflecting surface provided on the rearward surface of said transparent material for reflecting light through said signal, said signal being so constructed that when a beam of light from an independent source falls upon the signal and is reflected back to an observer the reflected rays will appear to the observer to be direct rays.

3. The combination of a signal comprising a plurality of small integral sections of transparent material, each of which has a relatively shallow spheroidal surface, said sections being arranged in close proximity to one another and with their axes substantially parallel, and a substantially plane reflecting surface provided on the rearward surface of said transparent material for reflecting light through said signal, said signal being arranged at an intermediate angle between two separate paths for reflecting and refracting beams of light from one of said paths to the other, and a substantially plane colored glass arranged adjacent said signal and in a plane substantially at right angles to one of said paths for causing said beams to traverse said colored glass once when reflected by said signal from one of said paths to the other.

In testimony whereof I have affixed my signature.

JOSEPH PREDHUMEAU.